United States Patent
Miyashita et al.

(10) Patent No.: US 9,802,383 B2
(45) Date of Patent: Oct. 31, 2017

(54) MULTILAYER COMPOSITE INTERIOR COMPONENT

(71) Applicants: Osamu Miyashita, Toyota (JP); Kenichi Yoshida, Toyota (JP); Hideaki Sakai, Toyota (JP); Masamori Hirose, Toyota (JP)

(72) Inventors: Osamu Miyashita, Toyota (JP); Kenichi Yoshida, Toyota (JP); Hideaki Sakai, Toyota (JP); Masamori Hirose, Toyota (JP)

(73) Assignee: Toyoda Iron Works Co., Ltd., Toyota-shi, Aichi (JP)

(*) Notice: Subject to any disclaimer, the term of this patent is extended or adjusted under 35 U.S.C. 154(b) by 36 days.

(21) Appl. No.: 14/915,738

(22) PCT Filed: Sep. 13, 2013

(86) PCT No.: PCT/JP2013/074911
§ 371 (c)(1),
(2) Date: Mar. 1, 2016

(87) PCT Pub. No.: WO2015/037144
PCT Pub. Date: Mar. 19, 2015

(65) Prior Publication Data
US 2016/0207277 A1    Jul. 21, 2016

(51) Int. Cl.
*B32B 3/30* (2006.01)
*B60R 13/02* (2006.01)
(Continued)

(52) U.S. Cl.
CPC .................. *B32B 3/30* (2013.01); *B32B 3/06* (2013.01); *B32B 3/12* (2013.01); *B32B 5/024* (2013.01);
(Continued)

(58) Field of Classification Search
None
See application file for complete search history.

(56) References Cited

U.S. PATENT DOCUMENTS

2003/0037377 A1    2/2003  Kawamura et al.
2003/0110567 A1    6/2003  Kawamura et al.
(Continued)

FOREIGN PATENT DOCUMENTS

CN    101870275 A    10/2010
JP    5-231474       9/1993
(Continued)

OTHER PUBLICATIONS

Office Action issued in Chinese patent application No. 201380079542.6 dated Dec. 12, 2016.
(Continued)

*Primary Examiner* — David Sample
*Assistant Examiner* — Donald M Flores, Jr.
(74) *Attorney, Agent, or Firm* — Finnegan, Henderson, Farabow, Garrett & Dunner, LLP

(57) ABSTRACT

A laminated composite interior component, having cushioning property, including a first member having a predetermined mating surface, and a second member made of an elastically deformable resin material, having a plate portion on and parallel to the mating surface and multiple solid protrusions formed integrally with the plate portion and having tip ends that protrude toward and contact the mating surface, and flexural rigidity of each protrusion against a compressive load having anisotropy around an axis perpendicular to the plate portion. Each of the protrusions have a longitudinal shape in a transverse section parallel to the plate portion and have one or more stepped portions, with a smaller section at its tip end side, in one of a pair of sidewalls located in a lateral direction perpendicular to a longitudinal (Continued)

direction of the longitudinal shape. Each protrusion is tilted toward a sidewall opposite the stepped portion.

7 Claims, 20 Drawing Sheets

(51) Int. Cl.
| | | |
|---|---|---|
| *B32B 5/02* | (2006.01) | |
| *B32B 5/24* | (2006.01) | |
| *B32B 25/18* | (2006.01) | |
| *B32B 27/08* | (2006.01) | |
| *B32B 27/12* | (2006.01) | |
| *B32B 27/30* | (2006.01) | |
| *B32B 27/32* | (2006.01) | |
| *B32B 27/36* | (2006.01) | |
| *B32B 3/06* | (2006.01) | |
| *B32B 3/12* | (2006.01) | |

(52) U.S. Cl.
CPC ............... *B32B 5/026* (2013.01); *B32B 5/24* (2013.01); *B32B 25/18* (2013.01); *B32B 27/08* (2013.01); *B32B 27/12* (2013.01); *B32B 27/304* (2013.01); *B32B 27/308* (2013.01); *B32B 27/32* (2013.01); *B32B 27/36* (2013.01); *B60R 13/0243* (2013.01); *B32B 2250/03* (2013.01); *B32B 2307/412* (2013.01); *B32B 2307/51* (2013.01); *B32B 2307/546* (2013.01); *B32B 2307/706* (2013.01); *B32B 2605/003* (2013.01)

(56) References Cited

U.S. PATENT DOCUMENTS

| | | |
|---|---|---|
| 2010/0264680 A1 | 10/2010 | Ishikawa |
| 2015/0072105 A1 | 3/2015 | Miyashita et al. |

FOREIGN PATENT DOCUMENTS

| | | |
|---|---|---|
| JP | 2002-238707 | 8/2002 |
| JP | 2003-103676 | 4/2003 |
| WO | WO 02/13660 A1 | 2/2002 |
| WO | WO 2013/132677 A1 | 9/2013 |

OTHER PUBLICATIONS

Search Report issued in European Patent Application No. 13893564.8 dated Apr. 13, 2017.

FIG. 9
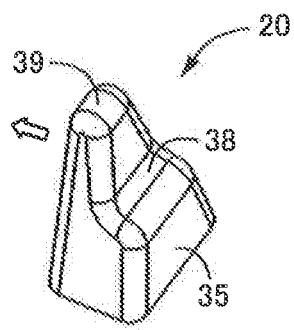
FIG. 10A
FIG. 10B
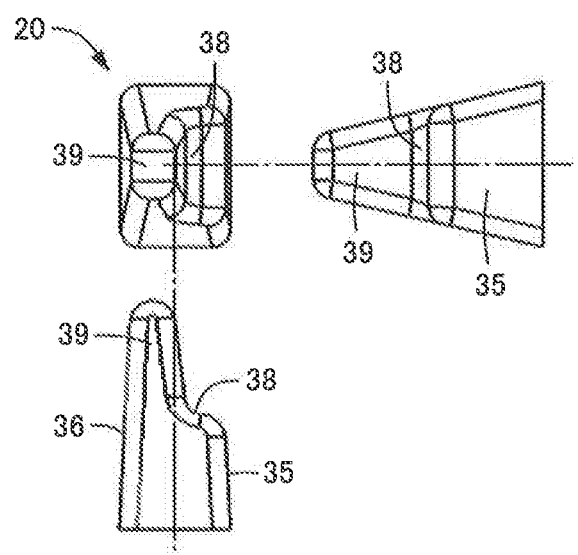
FIG. 10C

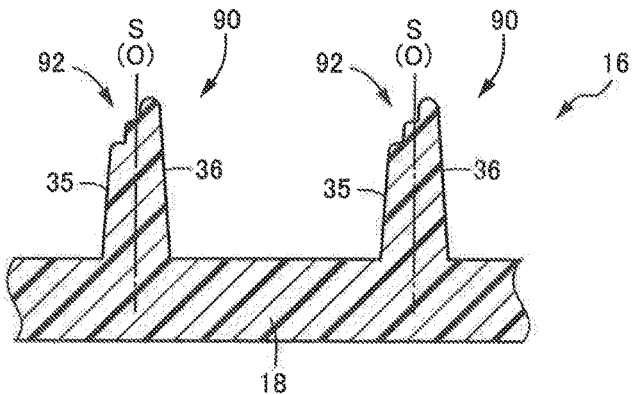
FIG.23
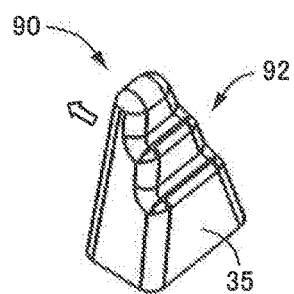
FIG.24
FIG.25A
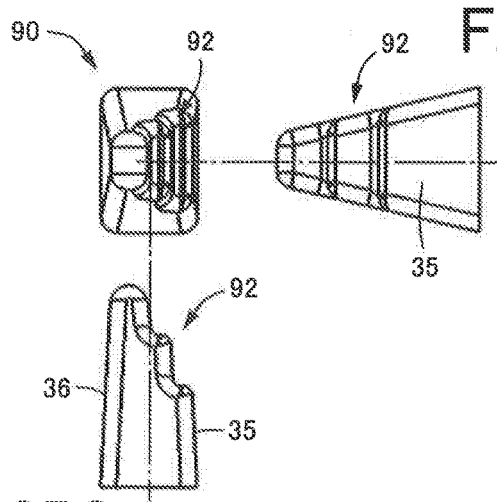
FIG.25B
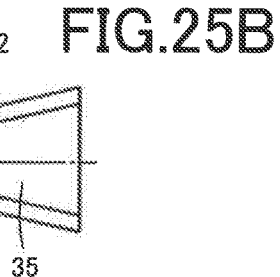
FIG.25C

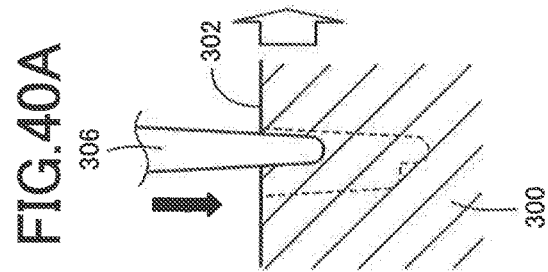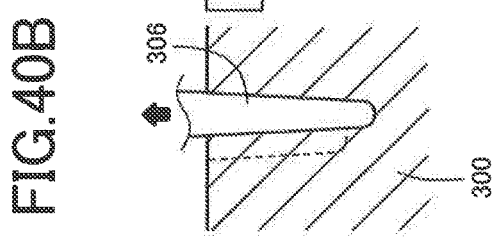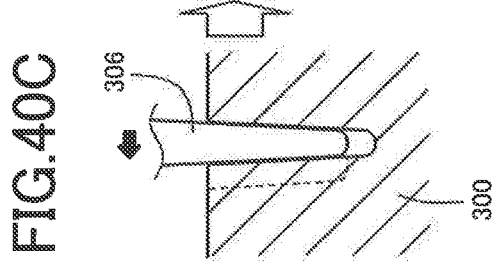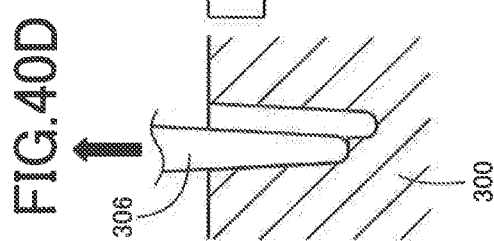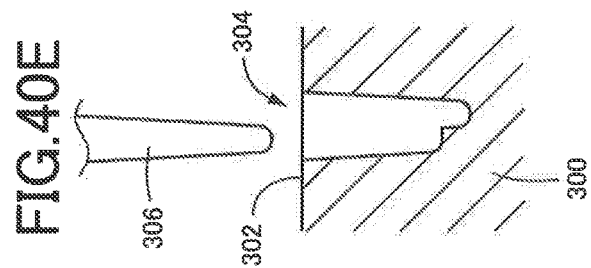

MULTILAYER COMPOSITE INTERIOR COMPONENT

CROSS-REFERENCE TO RELATED APPLICATIONS

This application is a national phase application of International Application No. PCT/JP2013/074911, filed Sep. 13, 2013, the content of which is incorporated herein by reference.

TECHNICAL FIELD

The present invention relates to laminated composite interior components, and more particularly to a technique of further improving the feel of a laminated composite interior component having cushioning properties due to elastic deformation of multiple protrusions.

BACKGROUND ART

Laminated composite interior components are known, including (a) a first member having a predetermined mating surface, and (b) a second member made of an elastically deformable resin material, having a plate portion substantially parallel to the mating surface and multiple solid protrusions formed integrally with the plate portion so as to protrude toward the mating surface so that space is created between the plate portion and the mating surface, and placed on the first member such that the protrusions contact the mating surface, and the laminated composite interior components having (c) cushioning properties as tip ends of the protrusions are pressed against the mating surface and elastically deformed. A component described in Patent Document 1 (see especially FIG. 13) is an example of such a laminated composite interior component, and relates to an interior component (armrest etc.) for vehicles. Patent Document 1 describes a technique of providing multiple pin-shaped protrusions on the back surface of a surface member as the second member to improve the feel (soft feel) of the surface member by elastic deformation of the protrusions. Patent Document 1 also describes a technique of providing long plate-shaped ribs instead of the pin-shaped protrusions.

RELATED ART DOCUMENTS

Patent Documents

Patent Document 1: Japanese Patent Application Publication No. 2003-103676

SUMMARY OF THE INVENTION

Problems to be Solved by the Invention

In such conventional laminated composite interior components, simple columnar protrusions are provided so as to be pressed substantially perpendicularly against the mating surface. Accordingly, when elastically deformed by a pressing load, the protrusions are not elastically deformed in a stable manner (in view of the direction in which the protrusions are bent etc.), which tends to cause variation in feel. Moreover, providing the ribs instead of the multiple protrusions increases rigidity and is less likely to provide a sufficient soft feel.

The present invention was developed in view of the above circumstances, and it is an object of the present invention to further improve the feel of a laminated composite interior component that has cushioning properties due to elastic deformation of multiple protrusions.

Means for Solving the Problems

To achieve the above object, a first aspect of the invention provides a laminated composite interior component including (a) a first member having a predetermined mating surface, and (b) a second member made of an elastically deformable resin material, having a plate portion substantially parallel to the mating surface and multiple solid protrusions formed integrally with the plate portion so as to protrude toward the mating surface so that space is created between the plate portion and the mating surface, and placed on the first member such that the protrusions contact the mating surface, and the laminated composite interior component having (c) cushioning properties as tip ends of the protrusions are pressed against the mating surface and elastically deformed, characterized in that (d) the multiple protrusions are provided so as to spread all over the plate portion, and flexural rigidity of each protrusion against a compressive load has anisotropy around an axis perpendicular to the plate portion, and (e) each of the multiple protrusions has a longitudinal shape in a transverse section parallel to the plate portion, the protrusion has one or more stepped portions so as to have a smaller section on its tip end side, the stepped portion being formed in only one of a pair of sidewalls located on both sides in a lateral direction perpendicular to a longitudinal direction of the longitudinal shape, and an axis of the protrusion is tilted toward an opposite sidewall side from the side on which the stepped portion is formed.

The stepped portion is a portion where the change rate of the area of the transverse section of the protrusion in the direction in which the protrusion protrudes is locally large in an intermediate part in the direction in which the protrusion protrudes, and is preferably a portion where the area of the transverse section of the protrusion changes discontinuously, or a portion where the area of the transverse section of the protrusion changes almost discontinuously at a high change rate.

A second aspect of the invention provides the laminated composite interior component recited in the first aspect of the invention, characterized in that (a) the multiple protrusions are arranged in a grid pattern of multiple polygons in which adjoining ones of the polygons have a common side, and the protrusions are each provided on each side of the polygons.

A third aspect of the invention provides the laminated composite interior component recited in the second aspect of the invention, characterized in that (a) the multiple protrusions have the same shape, and each of the protrusions is flexurally deformed in a fixed direction, namely to the opposite side from the side on which the stepped portion is formed, about its axis perpendicular to the plate portion, (b) the grid pattern is a repeated pattern of the same (same in shape and size) polygons that are quadrilaterals or hexagons, and (c) the protrusions are arranged so that one protrusion is located on each side of the polygons and so that each of the protrusions is bent toward inside or outside of the polygon, and are provided in such an attitude that the protrusions are bent alternately in opposite directions about a center of the polygon.

A fourth aspect of the invention provides the laminated composite interior component recited in the second or third aspect of the invention, characterized in that the grid pattern is a honeycomb pattern that is a repeated pattern of regular hexagons of a fixed size as the polygons.

A fifth aspect of the invention provides the laminated composite interior component recited in any one of the first to fourth aspects of the invention, characterized in that (a) the laminated composite interior component is a plate-shaped panel component, (b) the second member is a surface layer member, (c) the first member is a plate-shaped base member made of a resin material harder than the surface layer member, and (d) a front surface of the base member serves as the mating surface, and the surface layer member is placed on the front surface and is fixedly attached to the base member.

A sixth aspect of the invention provides the laminated composite interior component recited in the fifth aspect of the invention, characterized in that a surface member is firmly fixed to a front surface of the surface layer member, which is an opposite surface of the plate portion from a surface having the protrusions, so that the laminated composite interior component has a three-layer structure as a whole by the surface layer member, the surface member fixed thereto, and the plate-shaped base member.

A seventh aspect of the invention provides the laminated composite interior component recited in any one of the first to fourth aspects of the invention, characterized in that (a) the laminated composite interior component is a plate-shaped panel component, (b) the first member is a plate-shaped surface layer member made of an elastically deformable resin material, and (c) the second member is firmly fixed to a plate-shaped base member so that a back surface of the second member, which is an opposite surface of the plate portion from a surface having the protrusions, closely contacts the base member.

Effects of the Invention

In the laminated composite interior component constructed as described above, the multiple protrusions are provided so as to spread all over the plate portion, and flexural rigidity of each protrusion against the compressive load has anisotropy around the axis. The protrusions thus tend to be flexurally deformed in a specific direction determined by the anisotropy, which improves the soft feel (cushioning properties). In particular, since each of the protrusions has one or more stepped portions so as to have a smaller section on its tip end side, each protrusion has lower rigidity in its tip end portion and is thus more easily elastically deformed. This further improves the soft feel as the initial load is reduced. Further, since the direction in which the protrusion is bent (buckled) can be controlled, each protrusion is elastically deformed in a stable manner (in view of the direction in which each protrusion is bent etc.). This restrains variation in feel at the time the plate portion is pressed with a finger or a hand.

Further, since the protrusion has a longitudinal shape in a transverse section, the protrusion is likely to be flexurally deformed in a direction perpendicular to a longitudinal direction of the transverse section, and is less likely to be flexurally deformed in the longitudinal direction of the transverse section. As a result, each protrusion is elastically deformed in a stable manner. This restrains variation in feel at the time the plate portion is pressed with a finger or a hand. In the case where the protrusions have a simple rectangular shape in transverse section, for example, the structure of a mold is simplified, whereby manufacturing cost is reduced, and the laminated composite interior component can be configured at low cost.

Further, since the stepped portion is formed in only one of the pair of sidewalls located on both sides in the lateral direction perpendicular to the longitudinal direction of the longitudinal shape, each protrusion tends to be flexurally deformed in a fixed direction, namely to the opposite side from the side on which the stepped portion is formed, and is elastically deformed in a stable manner (in view of the direction in which each protrusion is bent etc.). This more properly restrains variation in feel. In particular, the axis of the protrusion is tilted toward the opposite sidewall side from the side on which the stepped portion is formed. Consequently, due to the stepped portion and the tilted attitude of the protrusion, the protrusion tends to be flexurally deformed, which further improves the soft feel, Moreover, the soft feel can be adjusted by the size of the stepped portion or the tilt angle of the tilted attitude etc.

In the second aspect of the invention, the protrusions are arranged in the grid pattern in which multiple polygons continuously adjoin each other, and the protrusions are each located on each side of the polygons. The multiple protrusions are thus arranged in a fixed arrangement pattern, which restrains variation in feel at the time the plate portion is pressed with a finger or a hand. By shifting the attitudes of the protrusions from each other so as to correspond to the sides in the grid pattern, the direction in which each protrusion is bent varies accordingly. The protrusions thus support each other, providing an appropriate rigid feel (not too-soft feel). This rigid feel together with the soft feel provided by elastic deformation of the protrusions can provide a further improved feel.

In the third aspect of the invention, in the case where the multiple protrusions have the same shape and each of the protrusions is flexurally deformed in a fixed direction, namely to the opposite side from the side on which the stepped portion is formed, and the protrusions are arranged in the grid pattern as a repeated pattern of the same polygons that are quadrilaterals or hexagons, the protrusions are arranged so that one protrusion is located on each side of the polygons and so that each of the protrusions is bent toward inside or outside of the polygon, and are provided in such an attitude that the protrusions are bent alternately in opposite directions about the center of the polygon. Accordingly, although the protrusions are flexurally deformed in the fixed direction, the protrusions forming polygons are deformed substantially in the same manner in the entire region of the grid pattern, whereby a uniform feel can be provided.

The fourth aspect of the invention is the case where the grid pattern formed by the multiple protrusions is a honeycomb pattern that is a repeated pattern of regular hexagons of a fixed size as the polygons. For example, by shifting attitudes of the protrusions by 60° or 120° from each other along respective sides of each regular hexagon, the anisotropy of elastic deformation that is caused by the pressing load is restrained, and a uniform feel is provided even if the pressing load is applied in an oblique direction.

The fifth aspect of the invention is the case where the laminated composite interior component is a plate-shaped panel component, the second member is a surface layer member, the first member is a plate-shaped base member harder than the surface layer member, and the surface layer member is placed on the front surface of the base member and is fixedly attached to the base member. When the plate portion of the surface layer member of such a panel component is pressed with a finger or a hand, the protrusions on the surface layer member are elastically deformed, providing an excellent feel. The effects similar to those according to the first to fourth aspects of the invention are appropriately achieved. Moreover, forming the laminated composite interior component having a two-layer structure comprised only of the first member and the second member can simplify the structure and reduce manufacturing cost.

The sixth aspect of the invention is the case where, in the panel component of the fifth aspect of the invention, the surface member is firmly fixed to the surface layer member. Since the opposite surface of the plate portion from the surface having the protrusions is covered by the surface member, sink marks, flashing, etc. on the plate portion caused due to the protrusions, if any, are not exposed to the outside, and scratches on the surface layer member are prevented. This increases a choice of resin materials for the surface layer member and increases flexibility in design of the shape of the protrusions etc. which relates to the feel. The feel can thus be adjusted more easily and appropriately.

The seventh aspect of the invention is the case where the laminated composite interior component is a plate-shaped panel component, the first member is a plate-shaped surface layer member made of an elastically deformable soft resin material, and the second member is firmly fixed to a plate-shaped base member so that a back surface of the second member, which is an opposite surface of the plate portion from a surface having the protrusions, closely contacts the base member. When the surface layer member (first member) of such a panel component is pressed with a finger or a hand, the back surface (mating surface) of the surface layer member is pressed against the tip ends of the protrusions of the second member. The protrusions are therefore elastically deformed, providing an excellent feel. The effects similar to those according to the first to fourth aspects of the invention are appropriately achieved. Moreover, since the second member having the protrusions is covered by the surface layer member (first member) and the plate portion of the second member is fixed to the base member, sink marks, flashing, etc. on the opposite surface of the plate portion from the protrusions, if any, are not exposed to the outside. This increases a choice of resin materials for the second member and increases flexibility in design of the shape of the protrusions etc. which relates to the feel. The feel can thus be adjusted more easily and appropriately.

BRIEF DESCRIPTION OF THE DRAWINGS

FIG. 6A is a plan view of the fine protrusions in a size close to their actual size, and FIG. 6B is an enlarged plan view of a portion VIb in FIG. 6A.

FIG. 9 is a perspective view showing one fine protrusion of FIGS. 6A and 6B.

FIGS. 10A to 10C show a set of three drawings of the fine protrusion of FIG. 9.

FIG. 23 is a longitudinal section corresponding to FIG. 7, illustrating fine protrusions as another reference example of the present invention.

FIG. 24 is a perspective view showing one fine protrusion of FIG. 23.

FIGS. 25A to 25C are a set of three drawings of the fine protrusion of FIG. 23.

FIGS. 40A to 40E show step diagrams illustrating an example of a machining method that is used to form a part of a mold for molding the surface layer member of the reference example in FIG. 4 by using an end mill, namely a part for molding fine protrusion.

MODES FOR CARRYING OUT THE INVENTION

Figure 1:
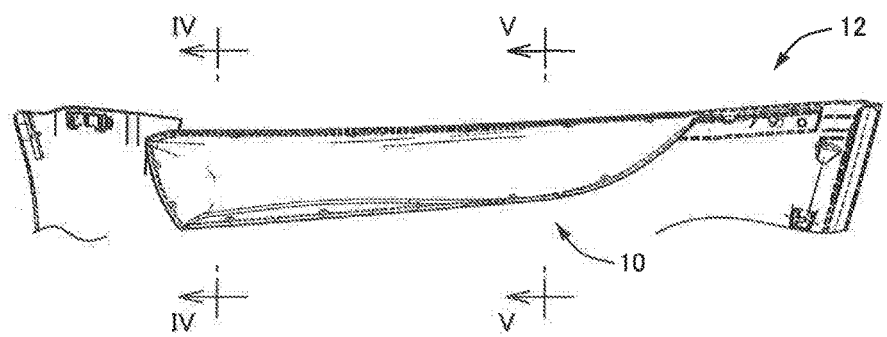
FIG. 1 is a schematic front view showing an upper end portion of a vehicle door trim having an ornament which is a reference example of the present invention, as viewed from the design surface side of the vehicle door trim (the interior side of a vehicle).

The present invention is applied to vehicle interior components such as a door trim, a luggage side trim, and an instrument panel, and ornaments etc. that are attached to the interior components, but is also applicable to panel components for applications other than vehicle applications. The present invention is applicable not only to plate-shaped panel components but also to three-dimensional components in which the second member is placed on the surface of the first member or the base member curved three-dimensionally so as to have a three-dimensional shape. In the case of using the first member as the base member, relatively hard synthetic resin materials are preferably used such as rigid polyvinyl chloride, polypropylene, polyethylene, and ABS. However, the first member may be made of other materials such as a metal. In the case of using the first member as the surface layer member, or for the resin material of the second member, various thermoplastic resins are preferably used such as soft polyvinyl chloride, styrene resin, olefin resin, and polyester resin. Not only various thermoplastic resins such as soft polyvinyl chloride, styrene resin, olefin resin, and polyester resin but also various surface members such as woven fabric, nonwoven fabric, knitted fabric, vinyl chloride, and a flexible film can be used as the surface member.

It is desirable that the multiple protrusions formed in the second member have a tapered shape so that its sectional area decreases as toward its tip end. However, the protrusion other than the stepped portion may have a substantially constant sectional area. The height dimension H of the protrusion is preferably, e.g., about 2 mm≤H≤4 mm. In the case of a protrusion having a plate shape and having a longitudinal shape in plan or in transverse section, the lateral dimension L of the plate shape (longitudinal dimension of the longitudinal transverse section) of the protrusion is preferably, e.g., about 1.5 mm≤L≤2.5 mm, and the thickness dimension d of the plate shape of the protrusion is preferably, e.g., about 1 mm≤d≤2 mm. It is preferable that the longitudinal transverse section of the protrusion having the plate shape is, e.g., a rectangular shape having four rounded corners or an elliptical shape having an arc shaped ends on both sides in the longitudinal direction. However, the longitudinal transverse section of the protrusion having the plate shape may have other longitudinal shapes such as a curved shape or a crank shape.

Each of the multiple protrusions has the stepped portion so as to have a smaller section in its tip end. Only one stepped portion may be formed, or two or more stepped portions may be formed like a staircase. In the case where the stepped portion is formed only in one of the right and left side walls so that the protrusion is asymmetrical about the neutral plane, the tip end of the protrusion unevenly contacts the mating surface. Accordingly, the protrusion tends to be flexurally deformed to the opposite side from the side that contacts the mating surface, namely to the opposite side from the stepped portion. The neutral plane is a plane bisecting the width of a predetermined longitudinal section of the protrusion which is parallel to the plate portion. For example, in the case of the protrusion having a plate shape, the neutral plane of the thickness direction of the plate shape is a plane bisecting the thickness of the plate shape in a direction parallel to the plate portion.

For example, the grid pattern of the second aspect of the invention in which the protrusions are arranged is a repeated pattern of the same (same in shape and size) equilateral triangles, squares, or regular hexagons as the polygons. However, this grid pattern may be a repeated pattern of rectangles, rhombuses, parallelograms, scalene triangles, irregular hexagons, etc. Alternatively, this grid pattern may be a grid pattern in which a plurality of kinds of polygons having different shapes or sizes are regularly repeated, or a grid pattern in which a plurality of kinds of polygons are irregularly arranged so as to adjoin each other. The protrusions can be arranged in various grid patterns. When the first aspect of the invention is carried out, the protrusions need not be arranged in a grid pattern. The multiple protrusions may be randomly arranged, or protrusions having different shapes may be combined.

It is desirable that the protrusions be arranged so that one protrusion is located on each side of the polygons of the grid pattern. However, two or more protrusions may be located on each side of the polygons. In the case where the polygon is a rectangle or parallelogram whose long and short sides have different lengths, the number of protrusions may be different between the long side and the short side. For example, the protrusions having the longitudinal shape in transverse section are provided in such an attitude that the longitudinal directions of their transverse sections are parallel to the sides of the polygons. However, the protrusions may be provided in such an attitude that the longitudinal directions of their transverse sections are perpendicular to the sides of the polygons, or may be provided in such a tilted attitude that the longitudinal directions of their transverse sections are tilted at a predetermined angle with respect to the sides of the polygons. The protrusions may be provided so that the longitudinal directions of their transverse sections having the longitudinal shape are either parallel or perpendicular to the sides of the polygons depending on the positions of the protrusions in the grid pattern.

The grid pattern of the fourth aspect of the invention is a honeycomb pattern as a repeated pattern of regular hexagons. A pitch P between two parallel sides of each regular hexagon (the center distance between the protrusions provided on these two sides) is preferably, e.g., 3.5 mm≤P≤7.5 mm, and is desirably 4 mm≤P≤7 mm. When P<3.5 mm, the protrusions are small, which degrades moldability. When P>7.5 mm, the difference in reaction force due to the presence and absence of the protrusions (the difference in reaction force between the position where the protrusion is located and the intermediate position between the protrusions) is large, which provides a strange feel, although it depends on the material and the thickness of the plate portion.

In the seventh aspect of the invention, the first member is the surface layer member, and the second member is firmly fixed to the plate-shaped base member. The laminated composite interior component thus has an at least three-layer structure including the base member. However, the surface member may be provided on the surface layer member so that the laminated composite interior component has a four-layer structure.

In order to improve the soft feel, it is desirable that the multiple protrusions that are formed so as to spread all over the plate portion be arranged at predetermined intervals according to the height of the protrusions so that the protrusions do not interfere with each other when flexurally deformed. However, for example, the multiple protrusions may be arranged so that the plurality of protrusions interfere with each other in a predetermined deformation stage.

EMBODIMENTS

Embodiments and reference examples of the present invention will be described in detail below with reference to the accompanying drawings.

Figure 2:
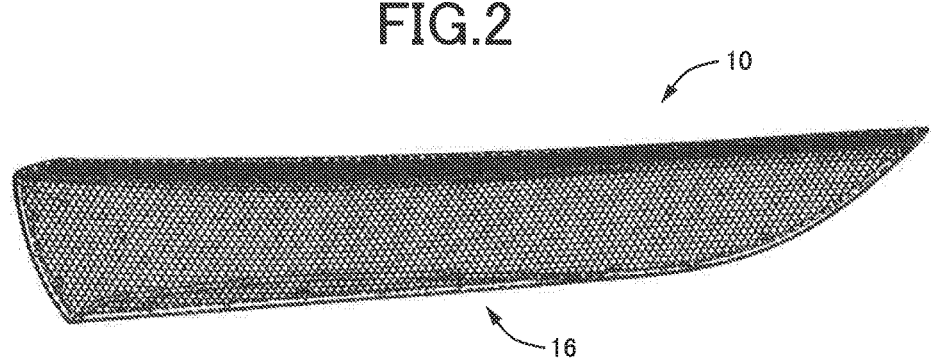
FIG. 2 is a diagram showing only the ornament of the vehicle door trim of FIG. 1, and transparently showing multiple fine protrusions formed on the back surface of a surface layer member, as viewed from the design surface side.
Figure 3:
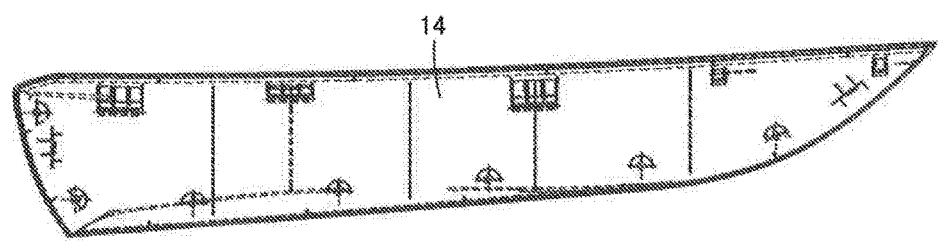
FIG. 3 is a diagram showing a base member of the ornament of FIG. 2 with the surface layer member removed therefrom.
Figure 4:
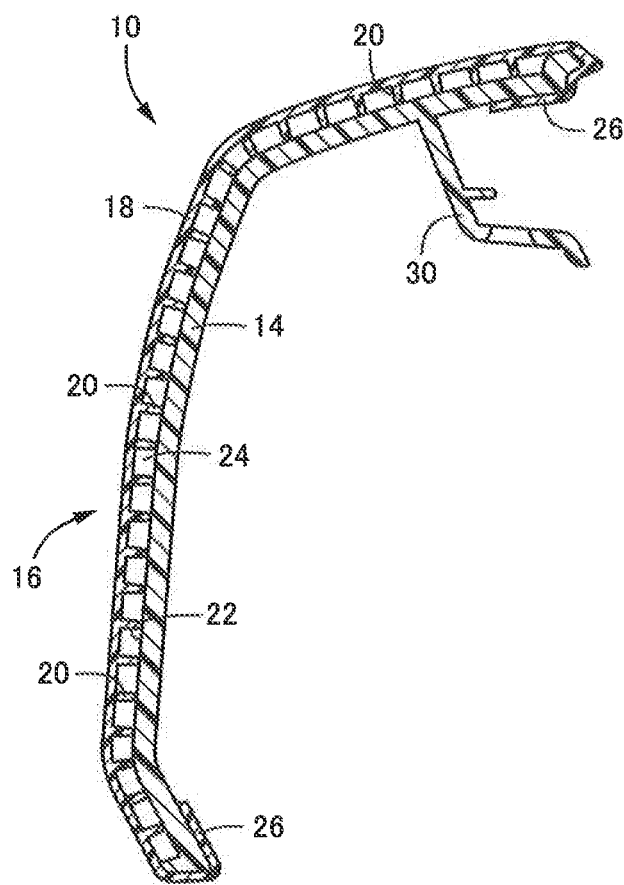
FIG. 4 is an enlarged sectional view of the ornament taken along a line IV-IV and viewed in the direction of arrows IV-IV in FIG. 1.
Figure 5:
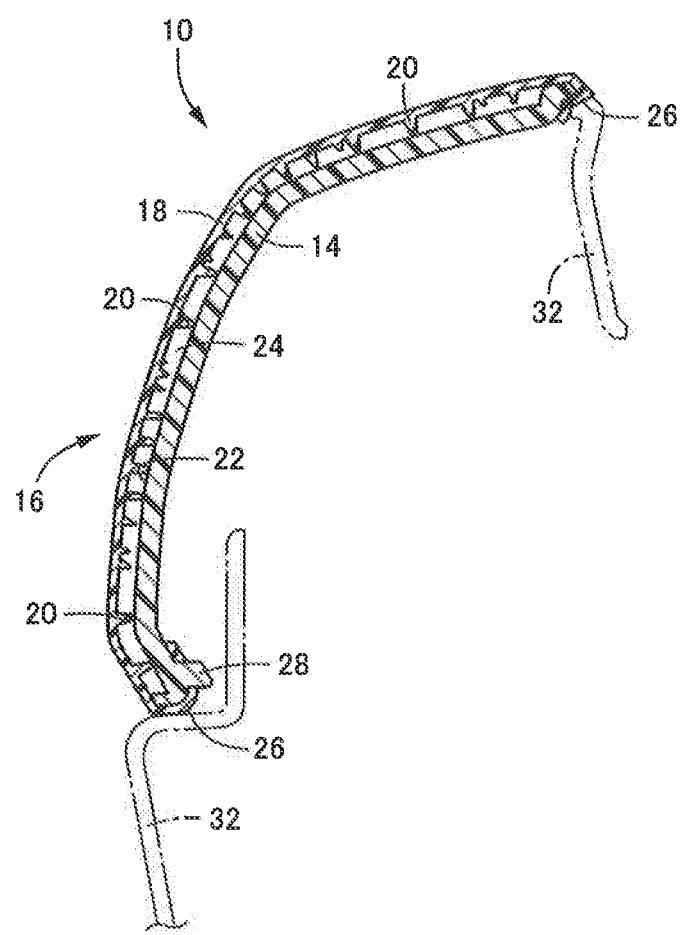
FIG. 5 is an enlarged sectional view of the ornament taken along a line V-V and viewed in the direction of arrows V-V in FIG. 1.

FIG. 1 is a schematic front view showing a shoulder portion (a lower end portion of a window) at the upper end of a vehicle door trim 12 having an ornament 10 as a reference example to which the present invention can be applied, as viewed from the design surface side, namely from the interior side, of a right door of a vehicle. FIG. 2 is a diagram showing only the ornament 10 of FIG. 1, and transparently showing multiple fine protrusions 20 (see FIGS. 6A and 6B, etc.) formed on the back surface of a surface layer member 16, as viewed from the design surface side. FIG. 3 is a diagram showing a base member 14 of the ornament 10 with the surface layer member 16 removed therefrom. FIG. 4 is a sectional view of the ornament 10 taken along a line IV-IV and viewed in the direction of arrows IV-IV in FIG. 1. FIG. 5 is a sectional view of the ornament 10 taken along a line V-V and viewed in the direction of arrows V-V in FIG. 1.

The ornament 10 is a laminated composite interior component formed by the plate-shaped base member 14 and the surface layer member 16 placed on a front surface 22 of the base member 14 so as to be substantially parallel to the front surface 22. The ornament 10 corresponds to the plate-shaped panel component, and the front surface 22 of the base member 14 corresponds to the mating surface. The surface layer member 16 is the second member and is molded as a single-piece member with a relatively soft, elastically deformable synthetic resin material such as soft polyvinyl chloride. The surface layer member 16 has a plate portion 18 substantially parallel to the front surface 22, and the multiple fine protrusions 20 that protrude toward the front surface 22 of the base member 14 are formed integrally with the plate portion 18 on the back surface of the plate portion 18. An outer peripheral terminal portion 26 of the plate portion 18 is placed around an outer peripheral edge of the base member 14 such that these fine protrusions 20 create space 24 between the plate portion 18 and the front surface 22 and the tip ends of the fine protrusions 20 closely contact the front surface 22. The surface layer member 16 is thus fixedly attached to the base member 14. The fine protrusions 20 correspond to the protrusions.

The base member 14 corresponds to the first member, and is molded as a single-piece member with a synthetic resin material harder than the surface layer member 16, such as polypropylene. The terminal portion 26 is hooked and held by a plurality of hook protrusions 28 formed on an outer peripheral edge of the back surface of the base member 14. A plurality of attachment engagement portions 30 are also formed integrally with the base member 14 on the back surface of the base member 14, and the ornament 10 is fixedly attached to the vehicle door trim 12 via the attachment engagement portions 30. With the ornament 10 thus being fixedly attached to the vehicle door trim 12 via the attachment engagement portions 30, the terminal portion 26 is pressed against the outer peripheral edge of the base member 14 by a plurality of holding portions 32 of the vehicle door trim 12, so that the terminal portion 26 is held around the outer peripheral edge of the base member 14. The terminal portion 26 may be fixed to a peripheral edge of the base member 14 by other fixing means such as an adhesive.

Figure 6A:
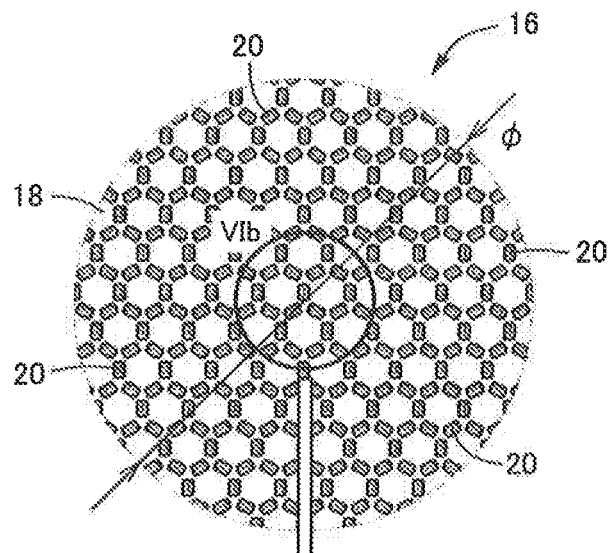
FIGS. 6A and 6B illustrate the multiple fine protrusions formed on the back surface of the surface layer member.
Figure 6B:
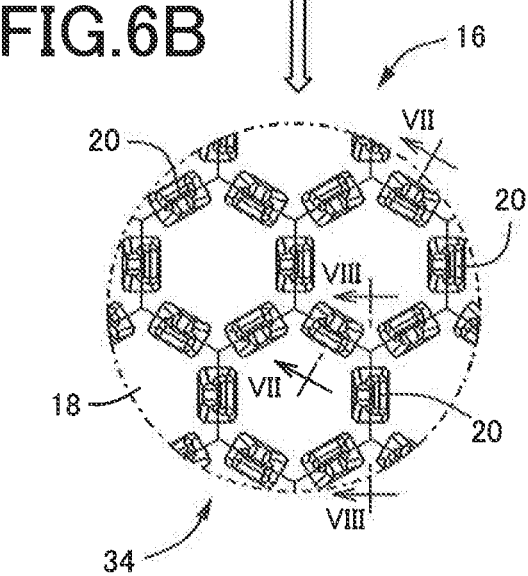
Figure 7:
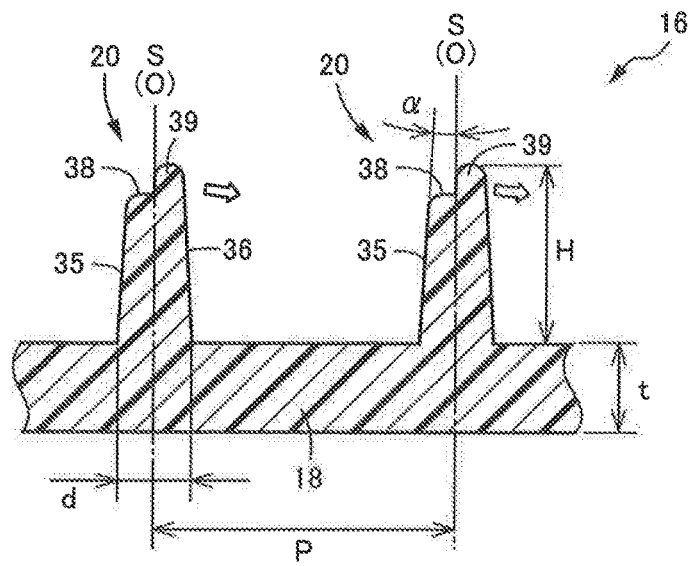
FIG. 7 is an enlarged longitudinal section of the fine protrusion taken along a line VII-VII and viewed in the direction of arrows VII-VII in FIG. 6B.
Figure 8:
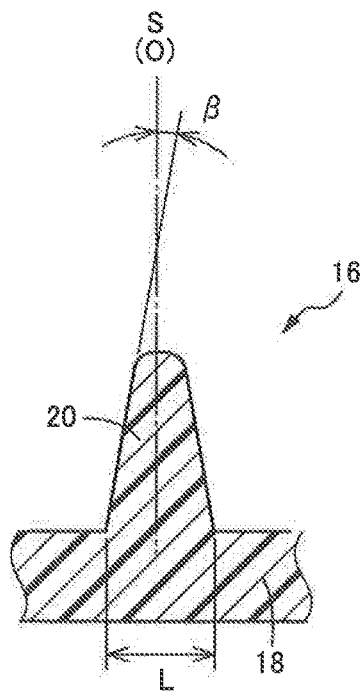
FIG. 8 is a longitudinal section of the fine protrusion taken along a line VIII-VIII and viewed in the direction of arrows VIII-VIII in FIG. 6B.

FIGS. 6A and 6B illustrate the multiple fine protrusions 20 formed on the back surface of the surface layer member 16. FIG. 6A is a plan view of the fine protrusions 20 in a size close to their actual size (diameter φ=50 mm), and FIG. 6B is an enlarged plan view of a portion VIb in FIG. 6A. These plan views show the fine protrusions 20 as viewed in a direction perpendicular to the plate portion 18. FIG. 7 is an enlarged longitudinal section taken along a line VII-VII and viewed in the direction of arrows VII-VII in FIG. 6B, namely a sectional view along the thickness direction of the plate shape of the fine protrusions 20. FIG. 8 is a longitudinal section taken along a line VIII-VIII and viewed in the direction of arrows VIII-VIII in FIG. 6B, namely a sectional view along the lateral direction of the plate shape of the fine protrusion 20. As can be seen from these figures, the multiple fine protrusions 20 have the same shape and protrude substantially perpendicularly (in the normal direction) to the plate portion 18, and an axis S of each fine protrusion 20 substantially matches an axis (perpendicular axis) O perpendicular to the plate portion 18. The fine protrusions 20 have a longitudinal shape as viewed in plan in the direction perpendicular to the plate portion 18. That is, the fine protrusions 20 have a longitudinal shape in transverse section parallel to the plate portion 18. The fine protrusions 20 are arranged in a grid pattern 34 of multiple polygons in which adjoining ones of the polygons have a common side. The fine protrusions 20 are each provided on each side of the polygons in such an attitude that the longitudinal direction of the transverse section of each fine protrusion 20 is substantially parallel to a corresponding one of the sides of the polygons. In the present reference example, the fine protrusions 20 have a rectangular shape with four rounded corners in transverse section, and are arranged in such an attitude that the longitudinal direction of the rectangular transverse section of each fine protrusion 20 matches a corresponding one of the sides of the polygons. The grid pattern 34 is a honeycomb pattern, namely a repeated pattern of regular hexagons of a fixed size as the polygons, and the fine protrusions 20 are provided so that one fine protrusion 20 is located on the middle part of each side of the regular hexagons.

Each of the fine protrusions 20 has a plate shape having a substantially rectangular transverse section, and has a gently tapered shape so that its sectional area decreases toward its tip end. The longitudinal sectional shape of each fine protrusion 20 in the lateral direction (the thickness direction of the plate shape) perpendicular to the longitudinal direction of the transverse section as shown in FIG. 7 is symmetrical, except its tip end, about a neutral plane perpendicular to the plate portion 18 (a plane perpendicular to the drawing plane and including the axis S), and the peripheral edge of the tip end (both ends of the sectional shape) is rounded. The longitudinal sectional shape of each fine protrusion 20 in the longitudinal direction of the transverse section (the lateral direction of the plate shape) as shown in FIG. 8 is symmetrical about a neutral plane perpendicular to the plate portion 18 (a plane perpendicular to the drawing plane and including the axis S), and the peripheral edge of the the tip end (both ends of the sectional shape) is rounded. A single stepped portion 38 is formed in one of a pair of sidewalls 35, 36 located on both sides in the thickness direction of the plate shape of each fine protrusion 20, namely the left sidewall 35 in FIG. 7 in the present reference example, so that the fine protrusion 20 has a smaller section in its tip end. This stepped portion 38 has such a shape that the left half of the tip end portion of the fine protrusion 20 in the thickness direction of the plate shape is cut out. The stepped portion 38 is a portion where the sectional area of the fine protrusion 20 changes substantially discontinuously, and the stepped portion 38 is formed so that a protruding tip end 39 having substantially half the sectional area of the tip end portion of the fine protrusion 20 is left only on the sidewall 36 side. The fine protrusion 20 has lower rigidity in the protruding tip end 39 as its sectional area is smaller, and the fine protrusion 20 therefore tends to be elastically deformed. The fine protrusion 20 having the plate shape has lower flexural rigidity in the thickness direction of the plate shape than in the lateral direction of the plate shape. The fine protrusion 20 therefore tends to be flexurally deformed in the thickness direction of the plate shape, namely in the lateral direction in FIG. 7. However, when the fine protrusions 20 are pressed by the front surface 22 of the base member 14 and subjected to a compressive load in the axial direction, only the protruding tip ends 39 contact the front surface 22 of the base member 14 and are subjected to an offset load. The fine protrusions 20 are thus flexurally deformed to the protruding tip end 39 side (in the right direction in FIG. 7). FIG. 9 is a perspective view of a single fine protrusion 20, and the white arrow represents the direction in which the fine protrusion 20 is bent when subjected to a compressive load. FIGS. 10A to 10C show a set of three drawings of the fine protrusion 20. FIG. 10A is a plan view, FIG. 10B is a right side view, and FIG. 10C is a front view. In FIGS. 9 and 10A to 10C, the stepped portion 38 is relatively large. However, the size of the stepped portion 38 is decided as appropriate so as to achieve predetermined cushioning performance.

The fine protrusions 20 will be described more specifically. A pitch P or an interval between two parallel sides of each regular hexagon of the grid pattern 34, namely the distance between centers of the fine protrusions 20 located on the two parallel sides, is 4 mm≤P≤7 mm, and in the present reference example, about 5 mm. The height dimension H of the fine protrusion 20 is 2 mm≤H≤3.5 mm, and in the present reference example, about 2.5 mm. The thickness dimension d of the plate shape of the fine protrusion 20 is 1 mm≤d≤2 mm, and in the present reference example, about 1.2 mm. The lateral dimension L of the plate shape of the fine protrusion 20 is 1.5 mm≤L≤2.5 mm and is larger than the thickness dimension d. In the present reference example, the lateral dimension L is about 1.8 mm. A tilt angle α of the sidewalls 35, 36 located on both sides in the thickness direction of the plate shape of the fine protrusion 20 is 2°≤α≤5°, and in the present reference example, about 3°. A tilt angle β of both edges in the lateral direction of the plate shape of the fine protrusion 20 is in the range of 10° to 15°, and in the present reference example, about 13°. The thickness t of the plate portion 18 is 1 mm≤t≤2 mm, and in the present reference example, about 1.5 mm. These dimensions and angles are decided as appropriate in view of the material of the surface layer member 16 etc. so as to achieve a predetermined feel (soft feel, rigid feel, etc.), strength, etc.

When the plate portion 18 of the surface layer member 16 of such an ornament 10 is pressed with a finger or a hand, the tip ends of the fine protrusions 20 are pressed against the front surface 22 of the base member 14 and elastically deformed. This elastic deformation provides cushioning properties and thus a predetermined feel. Each fine protrusion 20 of the present reference example has the stepped portion 38 so as to have a smaller section in its tip end. Each fine protrusion 20 therefore has lower rigidity in its tip end portion (the protruding tip end 39) and is more easily elastically deformed. This further improves the soft feel as the initial load is reduced. Since the stepped portion 38 is formed only in one sidewall 35 of the pair of the sidewalls 35, 36 in the thickness direction of the plate shape, each fine protrusion 20 therefore tends to be flexurally deformed in a fixed direction, namely to the opposite side from the side on which the stepped portion 38 is formed.

Figure 11:
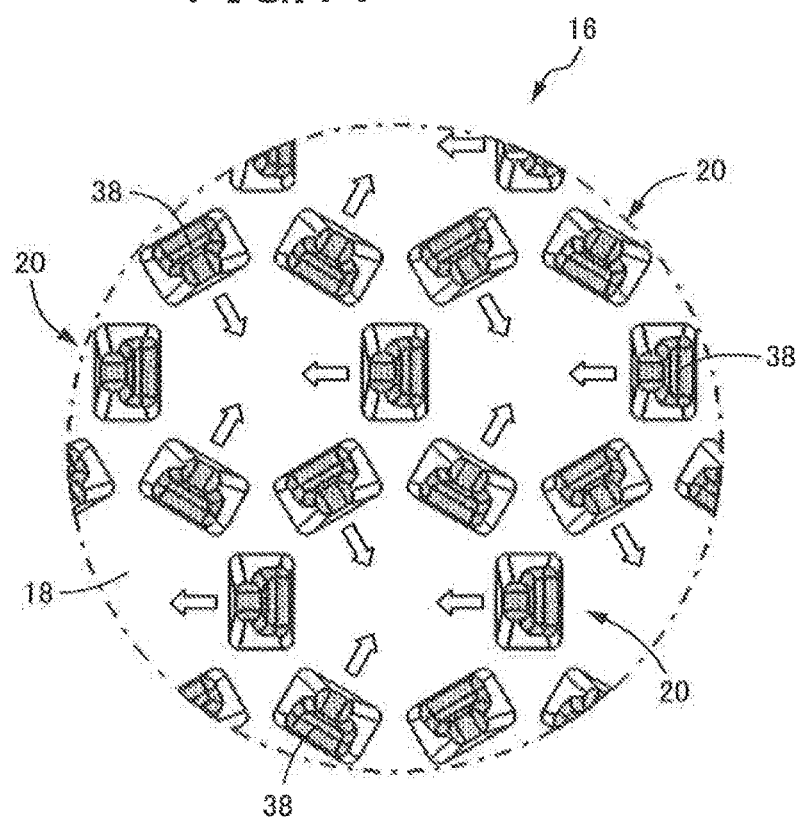
FIG. 11 is a plan view shown in FIG. 6B, in which the direction in which each fine protrusion is bent is shown by white arrows.
Figure 12:
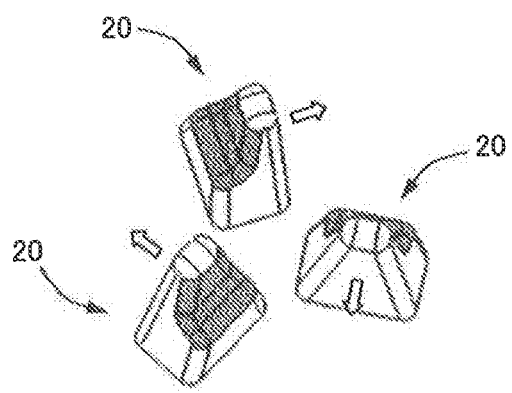
FIG. 12 is a perspective view of three fine protrusions located close to each other in FIG. 11, in which the direction in which each fine protrusion is bent is shown by white arrows.

The multiple fine protrusions 20 are provided in such an attitude that the fine protrusions 20 are bent alternately in opposite directions about the centerline, i.e., a line passing through a center, of each polygon, namely each regular hexagon, of the grid pattern 34. Specifically, of the six fine protrusions 20 located on each side of the regular hexagon, the three fine protrusions 20 located on every other side of the regular hexagon in the circumferential direction are arranged in such an attitude that the three fine protrusions are flexurally deformed toward the inside of the regular hexagon (the stepped portions 38 are located outside), and the remaining three fine protrusions 20 located therebetween are arranged in such an attitude that the remaining three fine protrusions are flexurally deformed toward the outside of the regular hexagon (the stepped portions 38 are located inside). In other words, the six fine protrusions 20 located on each side of the regular hexagon are arranged in such an attitude that the longitudinal directions of the transverse sections of the six fine protrusions 20 are parallel to the sides of the regular hexagon and the six fine protrusions 20 on respective sides of each regular hexagon alternately face in opposite directions. The multiple fine protrusions 20 are thus provided in such an attitude that adjoining ones of the fine protrusions 20 are rotated about the axis S (the perpendicular axis O) by 120° with respect to each other, so that the directions in which the adjoining fine protrusions 20 are bent are shifted by 120° from each other. The fine protrusions 20 are provided in the same attitude in the entire region of the grid pattern 34, and the six fine protrusions 20 forming each regular hexagon are flexurally deformed in the same manner. FIG. 11 is a plan view shown in FIG. 6B, in which the direction in which each fine protrusion 20 is bent is shown by white arrows. FIG. 12 is a perspective view of three fine protrusions 20 located close to each other in FIG. 11, in which the direction in which each fine protrusion 20 is bent is shown by white arrows. As can be seen from FIGS. 11 and 12, the multiple fine protrusions 20 are flexurally deformed so as not to interfere with each other. In FIG. 11, the stepped portions 38 and the protruding tip ends 39 are shaded. In FIG. 12, the stepped portions 38 are shaded.

As described above, in the present reference example, the multiple fine protrusions 20 are formed so as to spread all over the plate portion 18, and flexural rigidity of each fine protrusion 20 against the compressive load has anisotropy around the perpendicular axis O. The fine protrusions 20 thus tend to be flexurally deformed in a specific direction determined by the anisotropy, which improves the soft feel. That is, since the fine protrusions 20 of the present reference example have a longitudinal shape in transverse section, the fine protrusions 20 tend to be flexurally deformed in the lateral direction (the thickness direction of the plate shape) perpendicular to the longitudinal direction of the transverse section, which improves the soft feel. In particular, since the stepped portion 38 is formed in one sidewall 35 of each fine protrusion 20, each fine protrusion 20 has lower rigidity in its tip end portion (the protruding tip end 39) and is thus more easily elastically deformed. This further improves the soft feel as the initial load is reduced.

Since each fine protrusion 20 is flexurally deformed toward the opposite side from the stepped portion 38, the direction in which the fine protrusion 20 is bent (buckled) can be controlled by the attitude of the fine protrusion 20 about its axis S (the perpendicular axis O), and each fine protrusion 20 is elastically deformed in a stable manner (in view of the direction in which each fine protrusion 20 is bent etc.). This restrains variation in feel at the time the plate portion 18 is pressed with a finger or a hand.

The fine protrusions 20 are arranged in the grid pattern 34 in which multiple polygons continuously adjoin each other, and the fine protrusions 20 are each located on each side of the polygons. The multiple fine protrusions 20 are thus arranged in a fixed arrangement pattern, which restrains variation in feel at the time the plate portion 18 is pressed with a finger or a hand.

The multiple fine protrusions 20 have the same shape and are flexurally deformed in the fixed direction about the perpendicular axis O. The attitudes of the fine protrusions 20 are shifted from each other by a predetermined angle (in the reference example, 120°) so as to correspond to the sides in the grid pattern 34, and the direction in which each fine protrusion 20 is bent varies accordingly. The fine protrusions 20 thus support each other, providing an appropriate rigid feel (not too-soft feel). This rigid feel together with the soft feel provided by elastic deformation of the fine protrusions 20 can provide a further improved feel.

The grid pattern 34 is a honeycomb pattern that is a repeated pattern of regular hexagons of the same size as the polygons, and the attitudes of the fine protrusions 20 having a longitudinal (rectangular) shape in transverse section are shifted from each other by 120°. This restrains the overall anisotropy of elastic deformation that is caused by the pressing load, and provides a relatively uniform feel even if the pressing load is applied in an oblique direction.

The multiple fine protrusions 20 are placed so that one fine protrusion 20 is located on each side of the regular hexagons forming the grid pattern 34, and are provided in such an attitude that the fine protrusions 20 are bent alternately in opposite directions about the centerline of each regular hexagon of the grid pattern 34. Accordingly, although the fine protrusions 20 are flexurally deformed in the fixed direction, the fine protrusions 20 forming each regular hexagon are deformed substantially in the same manner in the entire region of the grid pattern 34, whereby a uniform feel can be provided.

In the present reference example, the ornament 10 has a two-layer structure in which only the surface layer member 16 is placed on the base member 14 and fixedly attached thereto. The ornament 10 therefore has a simple structure and can be manufactured at low cost.

In the present reference example, the multiple fine protrusions 20 have a simple rectangular shape in transverse section. For example, this simplifies the structure of a mold for molding the surface layer member 16 having the fine protrusions 20, whereby manufacturing cost is reduced, and the ornament 10 can be configured at low cost.

FIGS. 40A to 40E show an example of a machining method that is used to cut a molding recess 304 for molding the fine protrusion 20 in a molding surface 302 of a mold 300 for molding the surface layer member 16 by using an end mill 306. The end mill 306 has a tapered shape having the same tilt angle α as the sidewalls 35, 36 of the fine protrusion 20. First, as shown in FIGS. 40A to 40B, the end mill 306 is advanced (moved downward) to the sidewall 36 side where the stepped portion 38 is not to be formed, whereby cutting is performed. At this time, the end mill 306 is gradually moved downward while being translated in the direction perpendicular to the drawing plane by an amount corresponding to the lateral dimension L of the plate shape of the fine protrusion 20. Next, the end mill 306 is withdrawn (moved upward) by an amount corresponding to the stepped portion 38. FIG. 40C shows this state. The end mill 306 is then gradually moved to the left while being translated in the direction perpendicular to the drawing plane by the amount corresponding to the lateral dimension L, thereby forming a portion corresponding to the stepped portion 38. FIG. 40D shows this state. Thereafter, the end mill 306 is withdrawn and removed. An intended molding recess 304 is formed in this manner. Dashed lines in FIGS. 40A to 40E represent the shape of the intended molding recess 304. Since the tilt angle β of the edges in the lateral direction of the plate shape of the fine protrusion 20 is larger than the tilt angle α, the tilted surfaces having the tilt angle β are formed in a process to be performed later, etc.

This machining can be performed in various manners. For example, a portion having a large transverse section except the protruding tip end 39 may first be cut, and a recess corresponding to the protruding tip end 39 may then be cut in the bottom of the portion.

Figure 13:
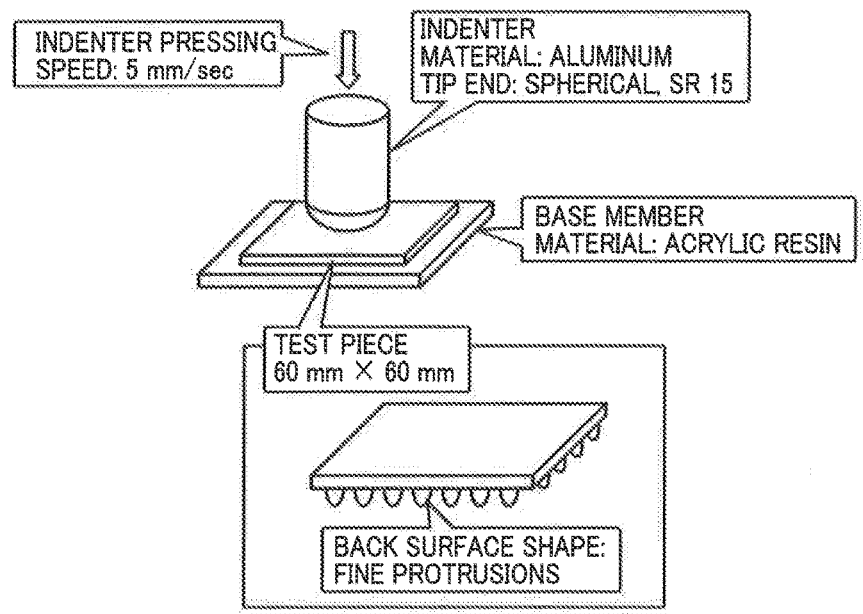
FIG. 13 is a diagram illustrating a test method that is used to examine the relationship between the reaction force and the stroke by using the fine protrusions.

The examination result of reaction force-stroke characteristics by using the multiple fine protrusions 20 will be described. FIG. 13 is a diagram showing a test method that is used to examine the relationship between the reaction force and the stroke by using a flat surface layer member 16 having multiple fine protrusions 20 as a test piece. The surface layer member 16 has a size of 60 mm by 60 mm and is made of an olefinic thermoplastic elastomer (TPO), and the surface layer member 16 has multiple fine protrusions 20 formed in a honeycomb grid pattern 34 as in the above reference example. The surface layer member 16 was placed on an acrylic base member in such an attitude that the fine protrusions 20 faced downward, and an aluminum indenter whose tip end has a spherical radius of 15 mm was pressed against the surface layer member 16 at 5 mm/sec to measure the relationship between the reaction force and the stroke by using a load cell connected to the indenter.

Figure 14:
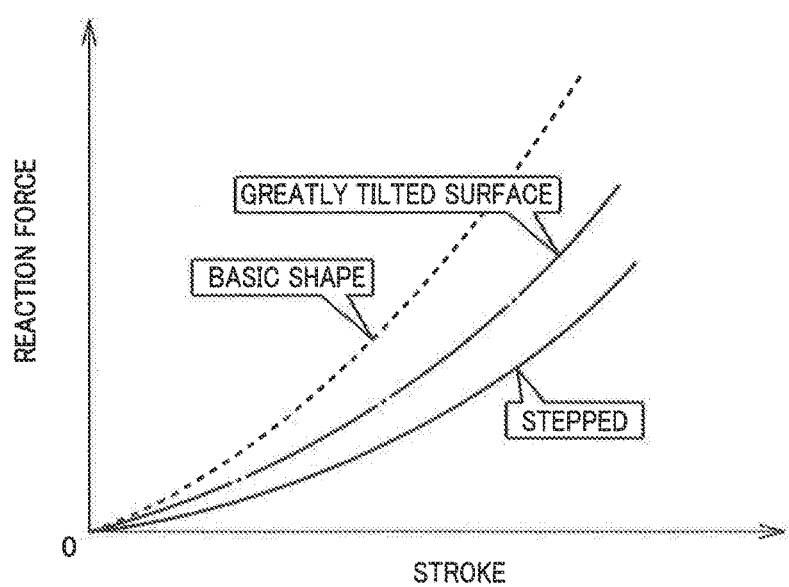
FIG. 14 is a graph showing the examination result of reaction force-stroke characteristics obtained for three fine protrusions according to the test method of FIG. 13.
Figure 15:
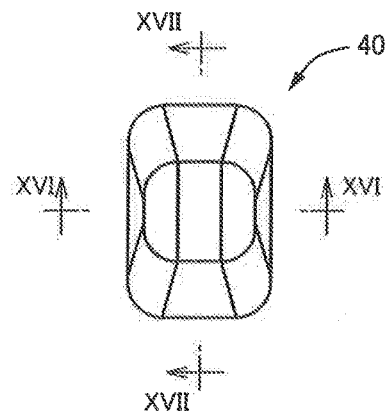
FIG. 15 is a plan view showing an example of a fine protrusion (basic shape) used as a comparative product in a test of FIG. 14.
Figure 16:
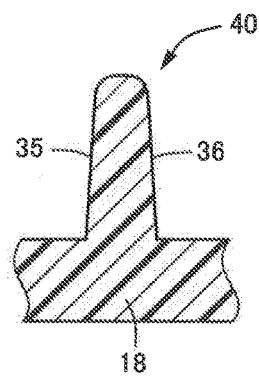
FIG. 16 is a longitudinal section of the fine protrusion taken along a line XVI-XVI and viewed in the direction of arrows XVI-XVI in FIG. 15.
Figure 17:
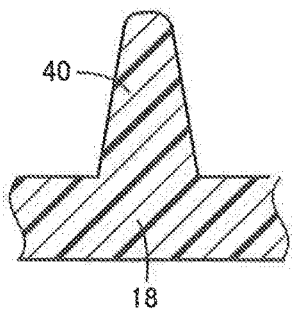
FIG. 17 is a longitudinal section of the fine protrusion taken along a line XVII-XVII and viewed in the direction of arrows XVII-XVII in FIG. 15.
Figure 18:
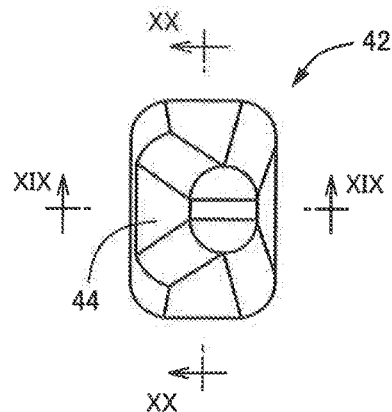
FIG. 18 is a plan view showing a fine protrusion with a greatly tilted surface, which was used as a comparative product in a test of FIG. 14.
Figure 19:
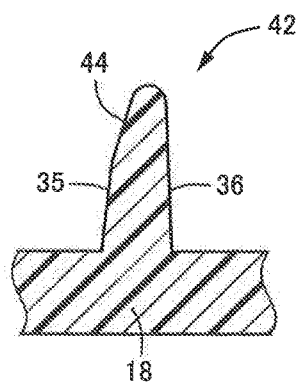
FIG. 19 is a longitudinal section of the fine protrusion taken along a line XIX-XIX and viewed in the direction of arrows XIX-XIX in FIG. 18.
Figure 20:
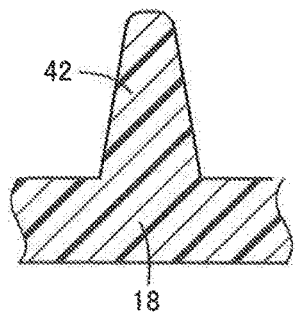
FIG. 20 is a longitudinal section of the fine protrusion taken along a line XX-XX and viewed in the direction of arrows XX-XX in FIG. 18.

Solid line in FIG. 14 represents reaction force-stroke characteristics obtained for the fine protrusions 20 of the reference example by the pressing test. Dashed line in FIG. 14 represents reaction force-stroke characteristics of a comparative product having fine protrusions 40 shown in FIGS. 15 to 17 instead of the fine protrusions 20. Alternate long and short dash line in FIG. 14 represents reaction force-stroke characteristics of a comparative product having fine protrusions 42 shown in FIGS. 18 to 20. FIG. 15 is a plan view of the fine protrusion 40, FIG. 16 is a longitudinal section taken along a line XVI-XVI and viewed in the direction of arrows XVI-XVI in FIG. 15, and FIG. 17 is a longitudinal section taken along a line XVII-XVII and viewed in the direction of arrows XVII-XVII in FIG. 15. The fine protrusion 40 is different from the fine protrusion 20 of the reference example in that the fine protrusion 40 has a basic shape with no stepped portion 38. Both of the longitudinal sectional shapes in the thickness direction and the lateral direction of the plate shape shown in FIGS. 16 and 17 are symmetrical up to the tip end portion about a neutral plane. FIG. 18 is a plan view of the fine protrusion 42, FIG. 19 is a longitudinal section taken along a line XIX-XIX and viewed in the direction of arrows XIX-XIX in FIG. 18, and FIG. 20 is a longitudinal section taken along a line XX-XX and viewed in the direction of arrows XX-XX in FIG. 18. The fine protrusion 42 is different from the fine protrusion 40 having the basic shape in that the fine protrusion 42 has in one sidewall 35 a greatly tilted surface 44 having a greater tilt angle than the tilt angle α and extending to the tip end of the fine protrusion 42. Since the fine protrusion 42 has the greatly tilted surface 44, the sectional area of the fine protrusions 42 continuously decreases in the tip end portion, and the fine protrusion 42 thus has lower rigidity in the tip end portion. The fine protrusion 42 therefore tends to be elastically deformed, and tends to be flexurally deformed in the opposite direction from the greatly tilted surface 44.

As can be seen from the characteristics shown in FIG. 14, in the fine protrusion 42 having the greatly tilted surface 44, the reaction force increases more gently with an increase in stroke, as compared to the fine protrusion 40 having the basic shape without the greatly tilted surface 44 and the stepped portion 38, thereby providing an improved soft feel. According to the fine protrusion 20 of the present reference example having the stepped portion 38, the reaction force increases more gently as compared to the fine protrusion 42, thereby providing a further improved soft feel. In particular, the presence of the protruding tip end 39 having a small section reduces the reaction force in the initial stage of the stroke, which reduces the overall reaction force characteristics.

Other reference examples and embodiments of the present invention will be described. In the following reference examples and embodiments, substantially the same portions as those of the above reference example are denoted with the same reference characters, and detailed description thereof will be omitted.

Figure 21:
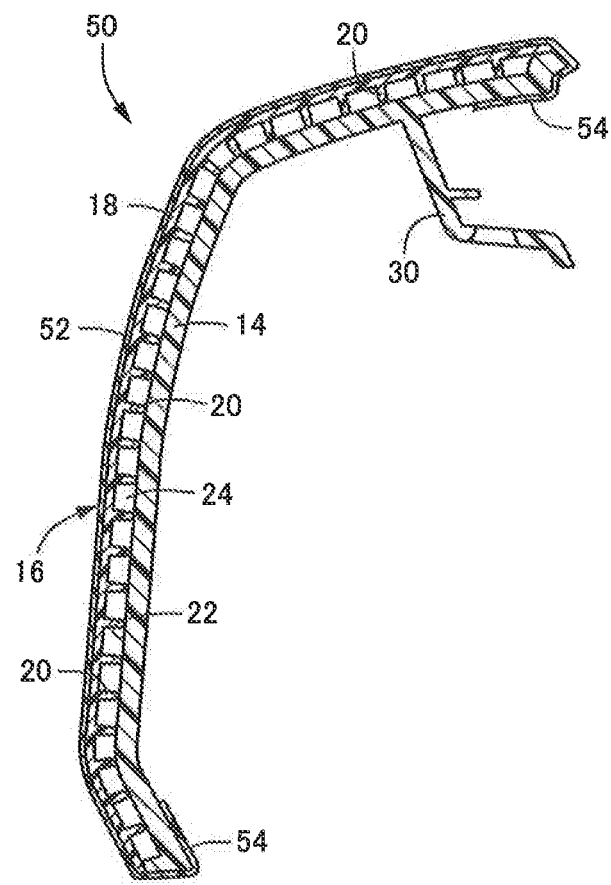
FIG. 21 is a sectional view corresponding to FIG. 4, illustrating a reference example in which a surface member is fixed to a surface layer member.

An ornament 50 as a reference example of FIG. 21 is different from the ornament 10 in that a surface member 52 is firmly fixed to the front surface of the surface layer member 16, namely the opposite surface of the plate portion 18 from the surface having the fine protrusions 20, so that the ornament 50 has a three-layer structure as a whole by the surface layer member 16, the surface member 52 fixed thereto, and the plate-shaped base member 14. For example, the surface member 52 is made of woven fabric, nonwoven fabric, knitted fabric, vinyl chloride, a flexible film, etc. Molding the surface member 52 integrally with the surface layer member 16 allows the surface member 52 to be molded simultaneously with the surface layer member 16 and allows the surface member 52 to be firmly fixed to the front surface of the surface layer member 16. An outer peripheral terminal portion 54 of the surface member 52 is placed around the outer peripheral edge of the base member 14, and is hooked and held by the hook protrusions 28. With the ornament 50 being fixedly attached to the vehicle door trim 12, the terminal portion 54 is pressed against the outer peripheral edge of the base member 14 by the holding portions 32. The surface layer member 16 together with the surface member 52 is thus fixedly attached to the base member 14.

Such an ornament 50 has functions and effects which are similar to those of the ornament 10. Moreover, since the surface layer member 16 is covered by the surface member 52, sink marks, flashing, etc. on the opposite surface of the plate portion 18 of the surface layer member 16 from the fine protrusions 20, if any, are not exposed to the outside, and scratches on the surface layer member 16 are prevented. This increases a choice of resin materials for the surface layer member 16 and increases flexibility in design of the shape of the fine protrusions 20 etc. which relates to the feel. The feel can thus be adjusted more easily and appropriately.

Figure 22:
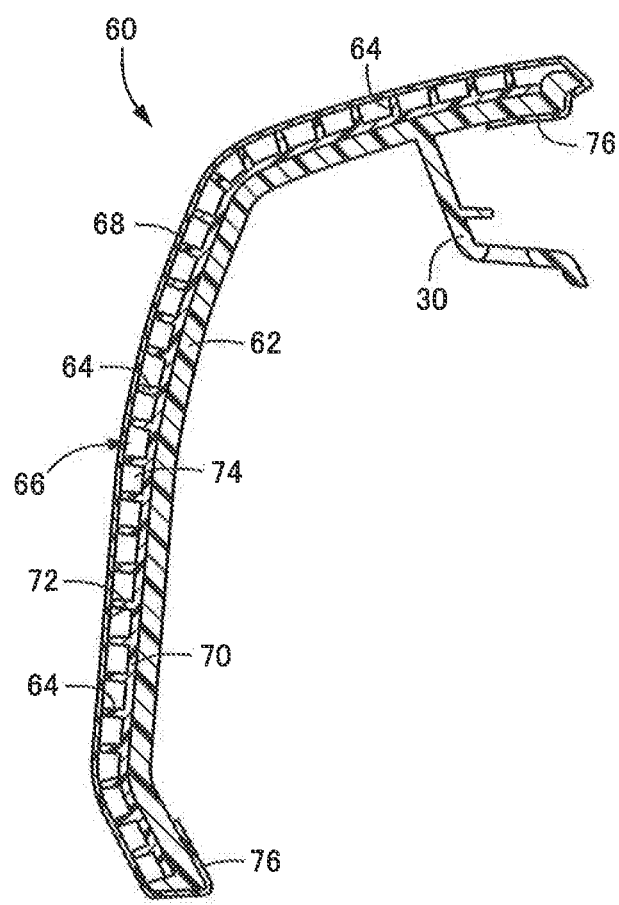
FIG. 22 is a sectional view corresponding to FIG. 4, illustrating a reference example in which the first member is a surface layer member, and a cushioning member corresponding to the second member is fixed to a base member.
Figure 26:
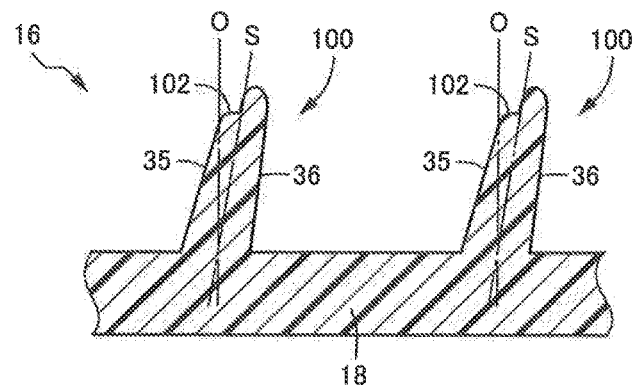
FIG. 26 is a longitudinal section corresponding to FIG. 7, illustrating fine protrusions as an embodiment of the present invention.
Figure 27:
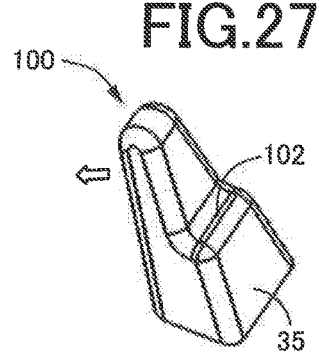
FIG. 27 is a perspective view showing one fine protrusion of FIG. 26.
Figures 28A, 28B:
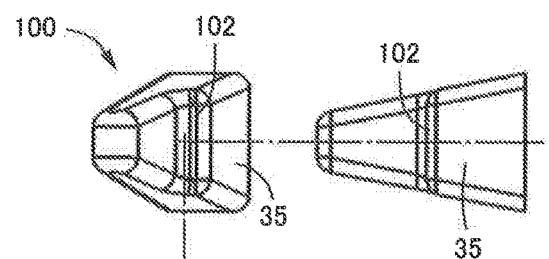
FIGS. 28A to 28C are a set of three drawings of the fine protrusion of FIG. 26.
Figure 28C:
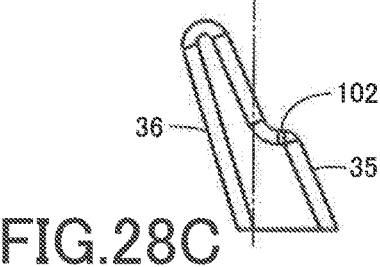
Figure 29:
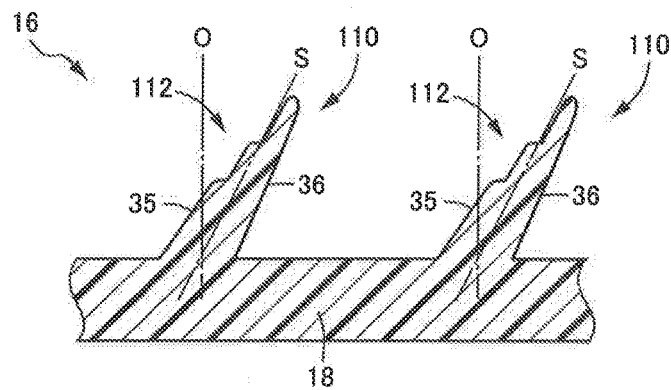
FIG. 29 is a longitudinal section corresponding to FIG. 7, illustrating fine protrusions as another embodiment of the present invention.
Figure 30:
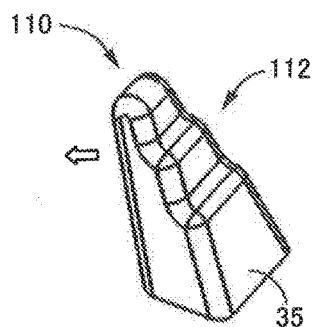
FIG. 30 is a perspective view showing one fine protrusion of FIG. 29.
Figures 31A, 31B:
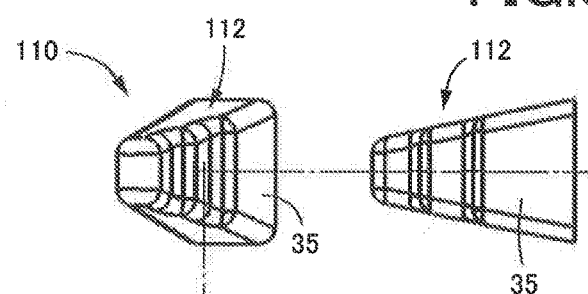
FIGS. 31A to 31C are a set of three drawings of the fine protrusion of FIG. 29.
Figure 31C:
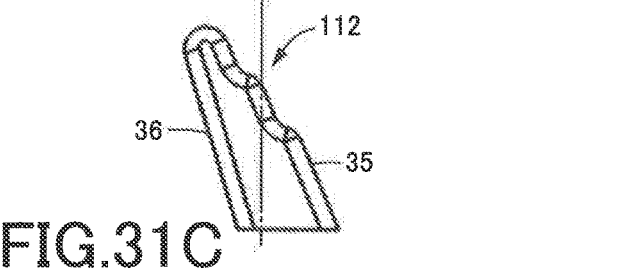

In an ornament 60 as a reference example of FIG. 22, a cushioning member 66 having multiple fine protrusions 64 is provided on the front surface of a plate-shaped base member 62, and a surface layer member 68 is attached so as to be placed on the fine protrusion 64 side of the cushioning member 66. Like the base member 14, the base member 62 is made of a relatively hard synthetic resin material, and the hook protrusions 28 and the attachment engagement portions 30 are formed integrally with the base member 62 on the back surface of the base member 62. The cushioning member 66 corresponds to the second member. The cushioning member 66 is made of an elastically deformable synthetic resin material like the surface layer member 16, and has a plate portion 70 that is firmly fixed to the front surface of the base member 62 so as to be in close contact therewith. The multiple fine protrusions 64 are formed integrally with the plate portion 70. For example, the fine protrusions 64 are configured similarly to the fine protrusions 20. The fine protrusions 64 are formed so as to protrude from the plate portion 70 toward the surface layer member 68 so that space 74 is created between a back surface 72 of the surface layer member 68 and the plate portion 70, and the tip ends of the fine protrusions 64 are in close contact with the back surface 72. The back surface 72 corresponds to the mating surface. The surface layer member 68 corresponds to the first member, and in the present reference example, is made of a relatively soft synthetic resin material like the surface layer member 16. An outer peripheral terminal portion 76 of the surface layer member 68 is placed around the outer peripheral edge of the base member 62, and is hooked and held by the hook protrusions 28, not shown. With the ornament 60 being fixedly attached to the vehicle door trim 12, the terminal portion 76 is pressed against the outer peripheral edge of the base member 62 by the holding portions 32. The surface member 52 may further be provided on the surface layer member 68.

When the surface layer member 68 of such an ornament 60 is pressed with a finger or a hand, the back surface 72 of the surface layer member 68 is pressed against the tip ends of the fine protrusions 64 of the cushioning member 66. The fine protrusions 64 are therefore elastically deformed, providing an excellent feel. The ornament 60 thus has effects similar to those of the ornament 10. Moreover, since the cushioning member 66 having the fine protrusions 64 is covered by the surface layer member 68 and the plate portion 70 of the cushioning member 66 is fixed to the base member 62, sink marks, flashing, etc. on the opposite surface of the plate portion 70 from the fine protrusions 64, if any, are not exposed to the outside. This increases a choice of resin materials for the cushioning member 66 and increases flexibility in design of the shape of the fine protrusions 64 etc. which relates to the feel. The feel can thus be adjusted more easily and appropriately.

FIGS. 23 to 34 illustrate other forms of the fine protrusions. FIG. 23 is a longitudinal section corresponding to FIG. 7, FIG. 24 is a perspective view showing only one fine protrusion 90 as a reference example, and FIGS. 25A to 25C are a set of three drawings of the fine protrusion 90. The fine protrusions 90 are different from the fine protrusions 20 in that two stepped portions 92 are formed like a two-step staircase in one sidewall 35 so that the area of the transverse section of the fine protrusion 90 decreases stepwise. Due to the stair-like stepped portions 92, rigidity of the fine protrusion 90 gradually increases from the tip end toward the base end, which provides a smoother feel. Moreover, the soft feel can be adjusted by the size of the stepped portions 92 etc. FIGS. 26 to 28A, 28B, and 28C are diagrams corresponding to FIGS. 23 to 25A, 25B, and 25C. Fine protrusions 100 as an embodiment of the present invention are the same as the fine protrusions 20 in that a single stepped portion 102 is formed in one sidewall 35, but are different from the fine protrusions 20 in that the axis S is tilted with respect to the perpendicular axis O by a predetermined tilt angle in the thickness direction of the plate shape, specifically toward the opposite sidewall 36 side from the side on which the stepped portion 102 is formed. Due to the stepped portion 102 and the tilted attitude of the fine protrusion 100, the fine protrusion 100 tends to be flexurally deformed to the sidewall 36 side, which further improves the soft feel. Moreover, the soft feel can be adjusted by the size of the stepped portion 102 or the tilt angle of the tilted attitude etc. FIGS. 29 to 31A, 31B, and 31C are diagrams corresponding to FIGS. 23 to 25A, 25B, and 25C. In fine protrusions 110 as an embodiment of the present invention, two stepped portions 112 are formed like a two-step staircase in one sidewall 35, and the axis S is tilted with respect to the perpendicular axis O by a predetermined tilt angle toward the opposite sidewall 36 side from the side on which the stepped portions 112 are formed. The fine protrusions 110 have functions and effects similar to those of the fine protrusions 90, 100. The size of the stepped portions 92, 102, 112 varies depending on the figure, but is decided as appropriate so as to achieve predetermined cushioning performance.

Figure 32:
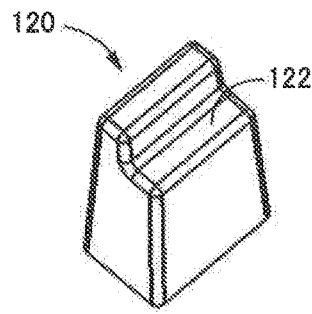
FIG. 32 is a perspective view of a single fine protrusion, illustrating a further reference example of the present invention.
Figure 33:
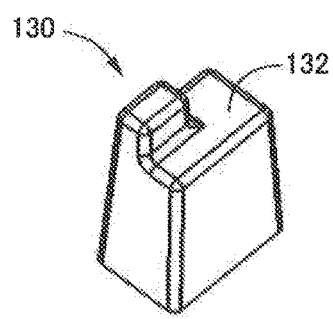
FIG. 33 is a perspective view of a single fine protrusion, illustrating a yet further reference example of the present invention.
Figure 34:
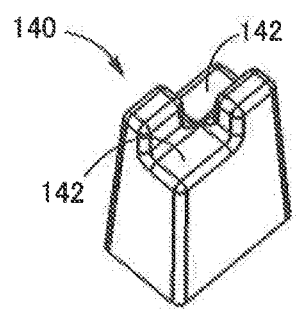
FIG. 34 is a perspective view of a single fine protrusion, illustrating a yet further reference example of the present invention.

FIGS. 32 to 34 are perspective views showing only one fine protrusion. A fine protrusion 120 as a reference example of FIG. 32 has the shape of a truncated quadrangular pyramid having a rectangular transverse section, and has a stepped portion 122 formed by cutting out substantially half the tip end portion of the fine protrusion 120. A fine protrusion 130 of FIG. 33 has the shape of a truncated quadrangular pyramid, and has a stepped portion 132 formed by cutting out substantially ¾ of the tip end portion of the fine protrusion 130 like a hook shape (L-shape). A fine protrusion 140 of FIG. 34 has the shape of a truncated quadrangular pyramid, and has a stepped portion 142 formed by cutting out two diagonally opposite corners of the tip end portions. The fine protrusions 120, 130, 140 have functions and effects which are similar to those of the above reference example. For example, the fine protrusions 120, 130, 140 have lower rigidity in their tip end portions as they have a smaller sectional area in their tip end portions. This improves the soft feel as the initial load is reduced.

Figure 35:
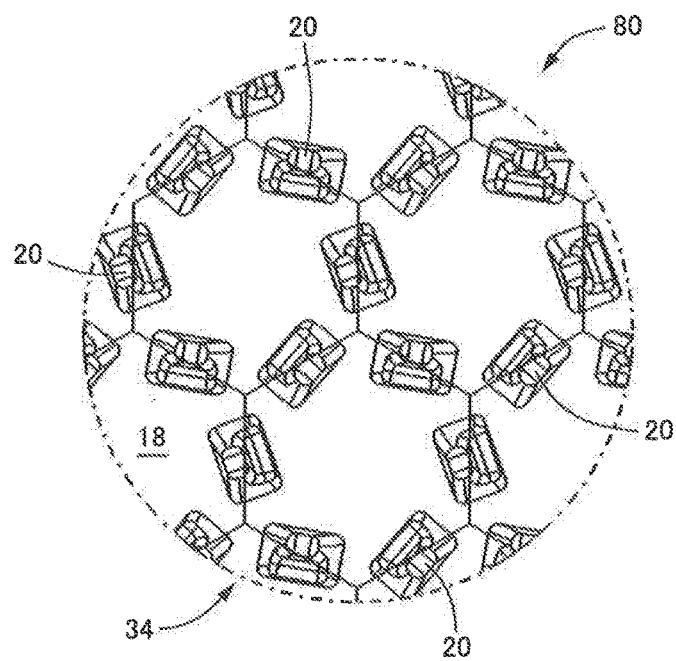
FIG. 35 is a plan view of multiple fine protrusions, illustrating a yet further reference example of the present invention in which the fine protrusions are arranged in a different attitude from those of FIGS. 6A and 6B.
Figure 36A:
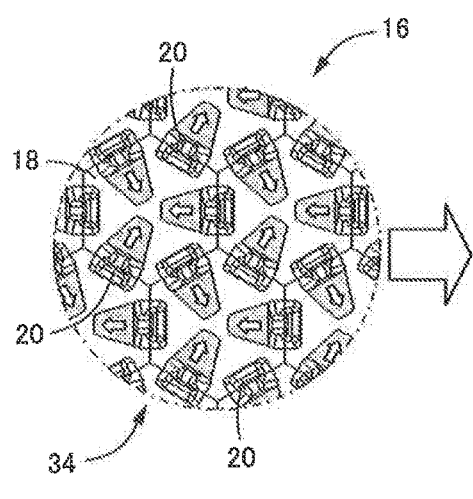
FIGS. 36A and 36B show diagrams showing regions (shaded areas) of elastically deformed fine protrusions in the reference example of FIG. 35, for comparison with the reference example of FIGS. 6A and 6B.
Figure 36B:
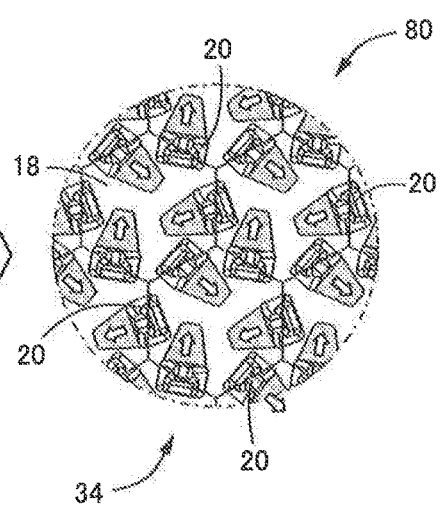

A surface layer member 80 as a reference example of FIG. 35 is different from the surface layer member 16 in the attitude in which the fine protrusions 20 are arranged on the plate portion 18. That is, in the present reference example, the fine protrusions 20 are tilted at a predetermined angle (e.g., in the range of about 10° to 30°, and in the reference example, about 20°) with respect to the sides of the regular hexagons of the grid pattern 34. In the case where the fine protrusions 20 are arranged parallel to the sides of the regular hexagons as shown in FIGS. 6A and 6B, the fine protrusions 20 are buckled toward the centers of the regular hexagons as shown by shaded areas in FIG. 36A when flexurally deformed by the pressing load. Accordingly, the height dimension H of the fine protrusions 20 is limited in order to avoid interference between the fine protrusions 20. However, by tilting the fine protrusions 20 as shown in FIG. 35, the directions in which the fine protrusions 20 are buckled are shifted from each other as shown by shaded areas in FIG. 36B. The fine protrusions 20 are therefore less likely to interfere with each other. This allows the height dimension H to be increased accordingly, which improves the soft feel.

Figure 37:
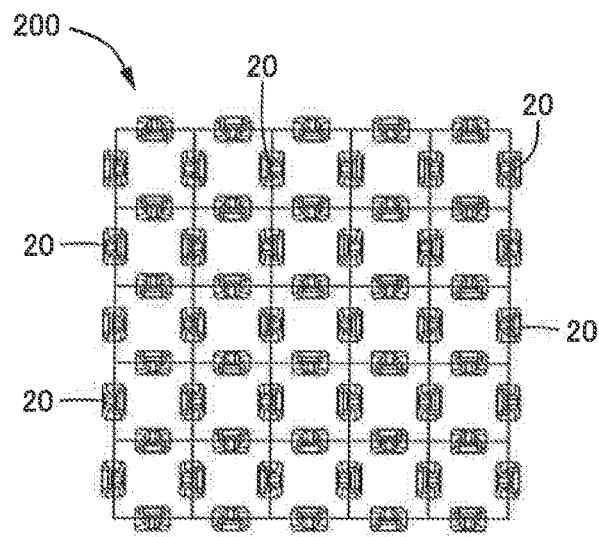
FIG. 37 is a plan view illustrating a reference example in which multiple fine protrusions are arranged in a grid pattern of squares.

FIG. 37 shows the case, as a reference example, where the fine protrusions 20 are arranged in a different pattern from that in FIGS. 6A and 6B. In this case, the multiple fine protrusions 20 are arranged in a grid pattern 200 of squares. The fine protrusions 20 are arranged so that one fine protrusion 20 is located on each side of the squares forming the grid pattern 200 in such an attitude that the longitudinal directions of the transverse sections of the fine protrusions 20 are parallel to the sides of the squares. The fine protrusions 20 are also provided in such an attitude that the fine protrusions 20 are bent alternately in opposite directions about the centerline of each square of the grid pattern 200. Accordingly, although the fine protrusions 20 are flexurally deformed in the fixed direction, the fine protrusions 20 forming each square are deformed substantially in the same manner in the entire region of the grid pattern 200, whereby a uniform feel can be provided. The present reference example thus has effects similar to those of the reference example of FIGS. 6A and 6B. Any of the other fine protrusions such as the fine protrusions 90 may be arranged in the grid pattern 200 of squares. The fine protrusions 100 or 110 being arranged in the grid pattern 200 of squares constitute an embodiment of the present invention. Although the present reference example is described with respect to the grid pattern 200 of squares, the fine protrusions 20 may be arranged in a grid pattern of rhombuses, rectangles, or parallelograms.

Figure 38:
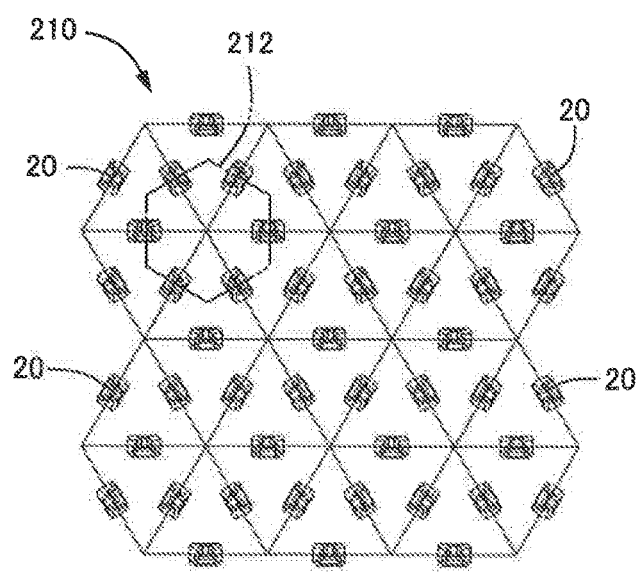
FIG. 38 is a plan view illustrating a reference example in which multiple fine protrusions are arranged in a grid pattern of equilateral triangles.

FIG. 38 shows the case, as a reference example, where the fine protrusions 20 are arranged in a different manner from that in FIGS. 6A and 6B. In this case, the multiple fine protrusions 20 are arranged in a grid pattern 210 of equilateral triangles. The fine protrusions 20 are arranged so that one fine protrusion 20 is located on each side of the equilateral triangles forming the grid pattern 210 in such an attitude that the longitudinal directions of the transverse sections of the fine protrusions 20 are parallel to the sides of the equilateral triangles. In this case as well, the longitudinal directions of the transverse sections of the multiple fine protrusions 20 arranged in the grid pattern 210 are shifted from each other by a predetermined angle. Accordingly, the fine protrusions 20 support each other, providing an appropriate rigid feel. The present reference example thus has functions and effects which are similar to those of the reference example of FIGS. 6A and 6B. For example, this rigid feel together with the soft feel provided by elastic deformation of the fine protrusions 20 can provide an excellent feel. Any of the other fine protrusions such as the fine protrusions 90 may be arranged in the grid pattern 210 of equilateral triangles. The fine protrusions 100 or 110 being arranged in the grid pattern 210 of equilateral triangles constitute an embodiment of the present invention.

The grid pattern 210 of FIG. 38 can also be used as a grid pattern that is a repeated pattern of regular hexagons 212. In this case, the fine protrusions 20 are arranged in such an attitude that the longitudinal directions of the transverse sections of the fine protrusions 20 are perpendicular to the sides of the regular hexagons 212. The grid pattern 34 of FIG. 6B can also be used as a grid pattern that is a repeated pattern of equilateral triangles. By shifting the grids of the square grids by half the pitch, the grid pattern 200 of FIG. 37 can also be used as a grid pattern of squares in which the fine protrusions 20 are arranged in such an attitude that the longitudinal directions of the transverse sections of the fine protrusions 20 are perpendicular to the sides of the squares.

Figure 39:
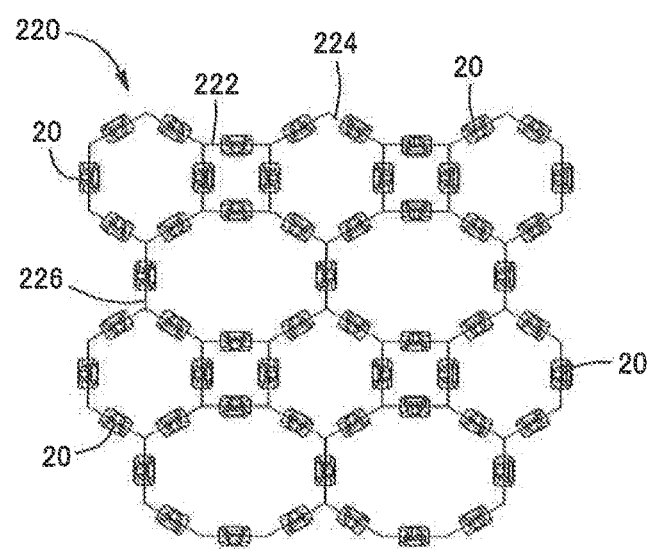
FIG. 39 is a plan view illustrating a reference example in which multiple fine protrusions are arranged in a grid pattern of a plurality of kinds of polygons.

A grid pattern 220 as a reference example of FIG. 39 is a combination of three kinds of polygons, namely quadrilaterals (in the figure, squares) 222, hexagons (in the figure, regular hexagons) 224, and octagons 226. In this grid pattern 220, the three kinds of polygons are regularly repeated in the same pattern. However, the fine protrusions 20 may be arranged in a grid pattern in which a plurality of kinds of polygons are irregularly combined. Any of the other fine protrusions such as the fine protrusions 90 may be used instead of the fine protrusions 20. The fine protrusions 100 or 110 being arranged in the grid pattern constitute an embodiment of the present invention.

The embodiments and reference examples of FIGS. 23 to 39 are described as modifications of the fine protrusions 20 of the surface layer member 16 shown in FIGS. 6A and 6B. However, the fine protrusions 64 of the cushioning member 66 in FIG. 22 may also be modified similarly.

Although the embodiments and reference examples of the present invention are described above in detail based on the drawings, these embodiments and reference examples are shown by way of example only, and the present invention can be embodied in various modified or improved forms based on the knowledge of those skilled in the art.

NOMENCLATURE OF ELEMENTS 10, 50, 60: ornament (laminated composite interior component) (plate-shaped panel) 14: base member (first member) 16, 80: surface layer member (second member) 18, 70: plate portion 100, 110: fine protrusions (protrusions) 22: front surface (mating surface) 24, 74: space 34, 200, 210, 220: grid pattern 102, 112: stepped portion 52: surface member 66: cushioning member (second member) 68: surface layer member (first member) 72: back surface (mating surface) 212: regular hexagon (polygon) 222: quadrilateral (polygon) 224: hexagon (polygon) 226: octagon (polygon) O: perpendicular axis (axis) S: axis

The invention claimed is:

1. A laminated composite interior component including a first member having a predetermined mating surface, and a second member made of an elastically deformable resin material, having a plate portion substantially parallel to the mating surface and multiple solid protrusions formed integrally with the plate portion so as to protrude toward the mating surface so that space is created between the plate portion and the mating surface, and placed on the first member such that the protrusions contact the mating surface, and the laminated composite interior component having cushioning properties as tip ends of the protrusions are pressed against the mating surface and elastically deformed, the multiple protrusions being provided so as to spread all over the plate portion, and flexural rigidity of each protrusion against a compressive load having anisotropy around an axis perpendicular to the plate portion, and each of the multiple protrusions having a longitudinal shape in a transverse section parallel to the plate portion, the protrusion having one or more stepped portions so as to have a smaller section on its tip end side, the stepped portion being formed in only one of a pair of sidewalls located on both sides in a lateral direction perpendicular to a longitudinal direction of the longitudinal shape, and an axis of the protrusion being tilted toward an opposite sidewall side from the side on which the stepped portion is formed.

2. The laminated composite interior component according to claim 1, wherein
the multiple protrusions are arranged in a grid pattern of multiple polygons in which adjoining ones of the polygons have a common side, and the protrusions are each provided on each side of the polygons.

3. The laminated composite interior component according to claim 2, wherein
the multiple protrusions have the same shape, and each of the protrusions is flexurally deformed in a fixed direction, namely to the opposite side from the side on which the stepped portion is formed, about its axis perpendicular to the plate portion,
the grid pattern is a repeated pattern of the same polygons that are quadrilaterals or hexagons, and
the protrusions are arranged so that one protrusion is located on each side of the polygons and so that each of the protrusions is bent toward inside or outside of the polygon, and are provided in such an attitude that the protrusions are bent alternately in opposite directions about a center of the polygon.

4. The laminated composite interior component according to claim 2, wherein
the grid pattern is a honeycomb pattern that is a repeated pattern of regular hexagons of a fixed size as the polygons.

5. The laminated composite interior component according to claim 1, wherein
the laminated composite interior component is a plate-shaped panel component,
the second member is a surface layer member,
the first member is a plate-shaped base member made of a resin material harder than the surface layer member, and
a front surface of the base member serves as the mating surface, and the surface layer member is placed on the front surface and is fixedly attached to the base member.

6. The laminated composite interior component according to claim 5, wherein
a surface member is firmly fixed to a front surface of the surface layer member, which is an opposite surface of the plate portion from a surface having the protrusions, so that the laminated composite interior component has a three-layer structure as a whole by the surface layer member, the surface member fixed thereto, and the plate base member.

7. The laminated composite interior component according to claim 1, wherein the laminated composite interior component is a plate-shaped panel component, the first member is a plate-shaped surface layer member made of an elastically deformable resin material, and the second member is firmly fixed to a plate-shaped base member so that a back surface of the second member, which is an opposite surface of the plate portion from a surface having the protrusions, closely contacts the base member.

* * * * *